(12) United States Patent
Bloy et al.

(10) Patent No.: US 11,514,449 B2
(45) Date of Patent: Nov. 29, 2022

(54) PRE-AUTHORIZATION OF NON-ACTIVATED PAYMENT INSTRUMENTS AT SPECIFIC MERCHANTS

(71) Applicant: The Toronto-Dominion Bank, Toronto (CA)

(72) Inventors: Adrian Bloy, Ottawa (CA); Samih Beydoun, Ottawa (CA)

(73) Assignee: The Toronto-Dominion Bank

(*) Notice: Subject to any disclaimer, the term of this patent is extended or adjusted under 35 U.S.C. 154(b) by 242 days.

(21) Appl. No.: 16/670,552

(22) Filed: Oct. 31, 2019

(65) Prior Publication Data
US 2021/0133743 A1 May 6, 2021

(51) Int. Cl.
*G06Q 20/40* (2012.01)
*G06Q 20/24* (2012.01)

(52) U.S. Cl.
CPC .......... *G06Q 20/401* (2013.01); *G06Q 20/24* (2013.01)

(58) Field of Classification Search
CPC ........ G06Q 20/40; G06Q 20/20; G06Q 20/34; G06Q 20/35; G06Q 20/32; G06Q 20/38
See application file for complete search history.

(56) References Cited

U.S. PATENT DOCUMENTS

2018/0276656 A1* 9/2018 Goyal ................ G06Q 20/3223
2020/0104942 A1* 4/2020 Riechers ................ G06Q 20/00

* cited by examiner

*Primary Examiner* — Hao Fu
(74) *Attorney, Agent, or Firm* — Fish & Richardson P.C.

(57) ABSTRACT

The present disclosure involves systems, software, and computer-implemented methods for pre-authorizing transactions using unactivated payment instruments at specific merchants. One example method includes receiving a transaction request associated with a no card present (NCP) transaction and a first credit account. In response to determining that the first credit account is associated with an unactivated payment instrument, a determination is made as to whether the credit account is associated with at least one pre-authorization rule for authorizing NCP transactions prior to activation of a payment instrument associated with the corresponding credit account is associated with the first credit account. If it is, a set of pre-authorization criteria associated with the at least one pre-authorization rule is identified, and the set of transaction data associated with the transaction request is compared to the criteria. If the transaction request satisfies the criteria, the transaction request is authorized and an authorization is transmitted.

20 Claims, 4 Drawing Sheets

Example Transaction 1: _405_
- Payment amount: $200
- Account: xyz123 (account number corresponding to non-activated card associated with indicator)
- Merchant ID: 23863 (Amazon)
- Channel ID: eCommerce

- Result: Transaction allowed.

Example Transaction 2: _410_
- Payment amount: $200
- Account: abc125 (account number corresponding to non-activated card not associated with indicator)
- Merchant ID: 23863 (Amazon)
- Channel ID: eCommerce

- Result: Transaction declined – no indicator present.

Example Transaction 3: _415_
- Payment amount: $100
- Account: xyz123 (account number corresponding to non-activated card associated with indicator)
- Merchant ID: 23864 (Whole Foods)
- Channel ID: Point-of-Sale

- Result: Transaction declined – indicator present, but attempt to enter a non-activated card at POS.

FIG. 4

PRE-AUTHORIZATION OF NON-ACTIVATED PAYMENT INSTRUMENTS AT SPECIFIC MERCHANTS

TECHNICAL FIELD

The present disclosure relates to computer-implemented methods, software, and systems for pre-authorizing transactions using unactivated payment instruments at specific merchants, allowing new lines of credit associated with those specific merchants to be immediately used without waiting for a physical card to be received.

BACKGROUND

Online and e-commerce transactions are ubiquitous in today's society. Many merchants, including those with brick and mortar locations, have found more and more of their sales to be delivered via online or connected channels. Using merchants' online platforms, customers may use their existing payment methods to complete transactions.

New credit applications typically result in a period of time during which an initial transaction may be available or allowable in response to a credit application acceptance and usage. However, the generated card may only be available for the single usage and may not be available for future transactions. Further, any credit account may result in contingent liability on the part of the providing merchant. Still further, purchases may be delayed while the customer waits for the generated card to arrive.

SUMMARY

The present disclosure involves systems, software, and computer-implemented methods for pre-authorizing transactions using unactivated payment instruments at specific merchants, allowing new lines of credit associated with those specific merchants to be immediately used without waiting for a physical card to be received. A first example system includes a communications module, at least one memory storing instructions, a repository storing a set of credit accounts, and a repository storing a set of pre-authorization rules for authorizing no card present (NCP) transactions prior to activation of a payment instrument associated with a corresponding credit account. Each credit account can be associated with a customer, and each credit account can be associated with a first indicator that indicates whether the payment instrument associated with the corresponding credit account has been activated. Each credit account can also be associated with a second indicator that indicates whether at least one pre-authorization rule has been associated with the corresponding credit account. At least one hardware processor can be interoperably coupled with the at least one memory and the communications module, wherein the instructions instruct the at least one hardware processor to perform various operations. Those operations can include receiving, via the communications module, a first signal including a transaction request associated with an NCP transaction associated with a first credit account in the plurality of credit accounts, wherein the transaction request is associated with a set of transaction data. In response to determining that the first credit account is associated with an unactivated payment instrument based on the first indicator, a determination can be made as to whether the first credit account is associated with a second indicator indicating that at least one pre-authorization rule is associated with the first credit account. In response to determining that the first credit account is associated with a second indicator indicating that at least one pre-authorization rule is associated with the first credit account, identify a set of pre-authorization criteria associated with the at least one pre-authorization rule associated with the first credit account can be identified, and then compared to the set of transaction data associated with the transaction request. In response to determining that the set of transaction data associated with the transaction request satisfies the identified set of pre-authorization criteria, then the transaction request can be authorized, and, via the communications module, a second signal including a transaction authorization corresponding to the received transaction request can be transmitted.

Implementations can optionally include one or more of the following features.

In some instances, in response to determining that set of transaction data associated with the transaction request does not satisfy the identified set of pre-authorization criteria, the instructions instruct the at least one hardware processor to reject the transaction request and transmit, via the communications module, a third signal including a transaction rejection corresponding to the received transaction request.

In some instances, the determination of whether the first credit account is associated with a second indicator indicating that at least one pre-authorization rule is associated with the first credit account is only performed in response to determining that the set of transaction data includes a non-tokenized set of payment data associated with the first credit account. In some of those instances, the non-tokenized set of payment data associated with the first credit account is stored at a merchant associated with the transaction request and associated with a customer account managed by the merchant. The transaction associated with the transaction request can be initiated by the customer when the customer does not have access to the non-tokenized set of payment data associated with the first credit account.

In some instances, the set of transaction data includes a merchant associated with the transaction request and a channel through which the requested transaction is performed. In some of those instances, the set of pre-authorization criteria associated with the at least one pre-authorization rule associated with the first credit account includes an identification of at least one pre-authorized merchant and at least one pre-authorized transaction channel corresponding to each of the at least one pre-authorized merchants. Further, determining that the set of transaction data associated with the transaction request satisfies the identified set of pre-authorization criteria can include determining that the merchant associated with the transaction request matches at least one of the at least one pre-authorized merchants in the set of pre-authorization criteria, and wherein the channel through which the requested transaction is performed matches the at least one pre-authorized transaction channel corresponding to the merchant associated with the transaction request. In some of those instances, in response to determining that either the merchant associated with the transaction request does not match at least one of the at least one pre-authorized merchants or that the channel through which the requested transaction is performed does not match the at least one pre-authorized transaction channel corresponding to the merchant associated with the transaction request, the transaction request can be rejected and, via the communications module, a fourth signal including a transaction rejection corresponding to the received transaction request can be transmitted.

In some instances, the instructions instruct the at least one hardware processor to receive, via the communications module, a fifth signal including an indication that the payment instrument associated with the first credit account is activated. In response to activation of the payment instrument, the second indicator associated with the first credit account can be removed.

In some instances, no physical version of the payment instrument is generated for the first credit account after the first credit account is opened and prior to the transaction request.

Similar operations and processes may be performed in a different system comprising at least one processor and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. Additionally, similar operations can be associated with or provided as computer-implemented software embodied on tangible, non-transitory media that processes and transforms the respective data. Some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 4 illustrates several example transactions handled by the described transactions, including their associated information, and provides example responses and reasoning for their authorization or rejection.

DETAILED DESCRIPTION

Figure 1:
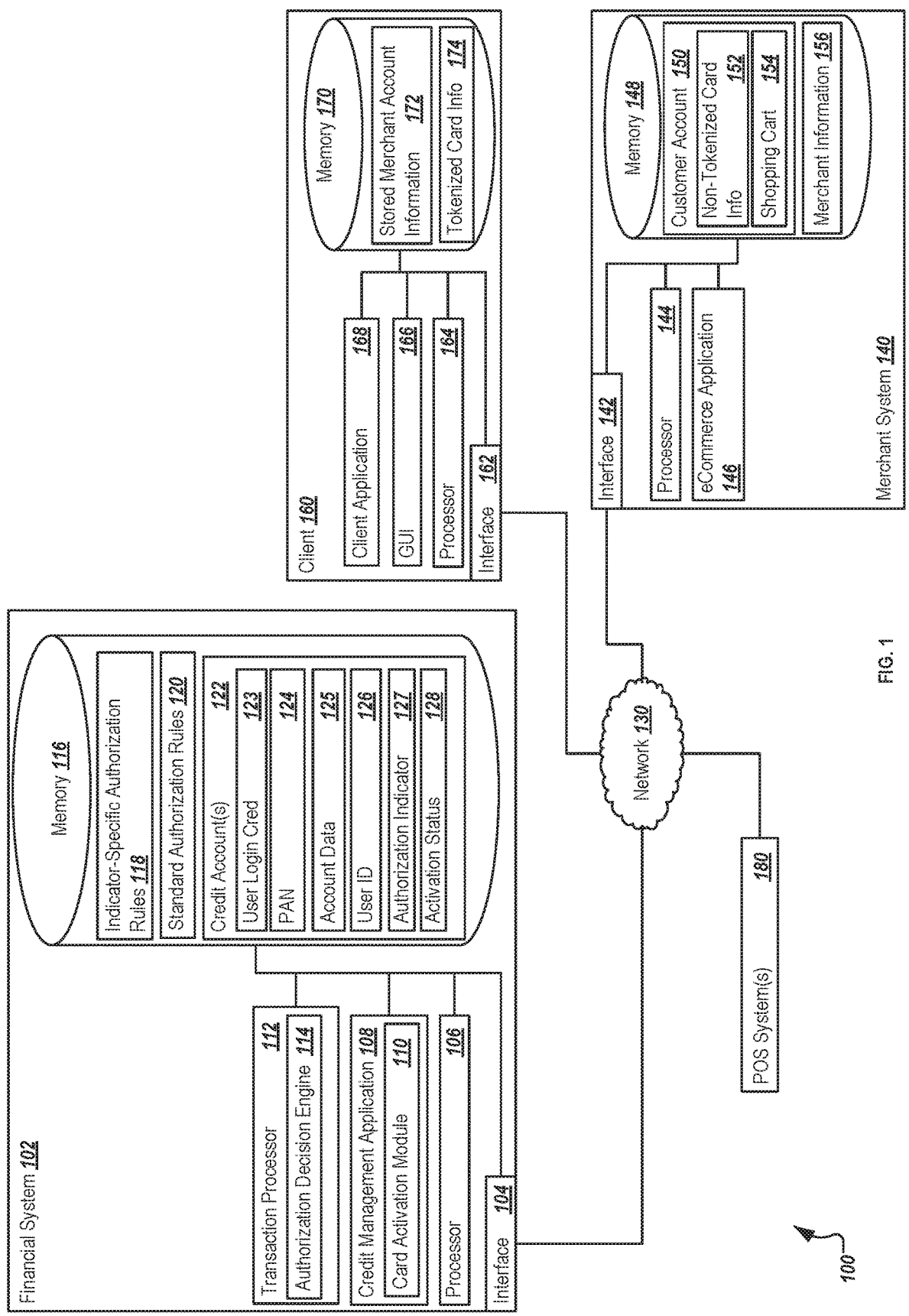
FIG. 1 is a block diagram illustrating an example system for pre-authorizing transactions using unactivated payment instruments at specific merchants.

The present disclosure describes various tools and techniques associated with authorizing transactions using unactivated or not-yet activated, payment instruments at specific merchants, allowing new lines of credit associated with those specific merchants to be immediately used without waiting for a physical card to be received. Specifically, the described solution allows financial institutions to identify merchant-specific transactions as acceptable for certain payment instruments, even when the corresponding physical cards have not been activated, by using a merchant-specific indicator associated with the account and confirming a limited set of transaction channels and criteria where transactions associated with the account are allowed.

As described in U.S. patent application Ser. No. 16/135,272 and Ser. No. 16/135,278, both incorporated by reference, various techniques may be used to provision new payment instruments for customers without requiring a physical card to be generated and provided before a customer can use the card to begin performing transactions. The '272 and '278 Applications, as well as traditional application techniques, allow customers or users to apply for credit generally from a financial institution or associated with a particular merchant. In some instances, those applications may be co-branded with a particular merchant, and identified as instruments that may be used prior to activation.

In current solutions, attempted payment transactions may be received as tokenized or non-tokenized requests. Tokenized payments may allow customers or users to protect their sensitive data by replacing the actual payment instrument identifier and data with an algorithmically generated number, called a token. The actual payment instrument identifier and data needed to process a payment request can be stored in a token vault, which can be accessed and applied without transmitting or making otherwise available the actual payment instrument information. Those tokenized payments may provide security for a credit or debit card that has been provisioned for a user or customer and can avoid interception by malicious parties. Additionally, should a breach of a merchant occur, the token information can simply be reset and avoid major disruption to particular accounts. Processes for handling tokenized payment attempts may take a first path with its own particular requirements, and may include, for example, payments made via Apple Pay, Google Pay, mobile wallets, or merchant tokenization, among others.

In the described solution, non-tokenized payments are received and handled differently than tokenized payments using a second path of logic, and can be associated with specific rules and handling procedures to allow specific pre-authorizations to be granted and used without the card. In particular, the present solution is directed to transactions identified as no card present (or NCP) transactions (e.g., based on a particular flag or other indicator) performed for particular non-activated cards (e.g., a new merchant co-branded credit card), where the transactions are only allowed when used for merchant-specific purchases using a particular channel or channels associated with the existing rule set, such as through an e-Commerce or online purchasing channel. Attempts to transact using the card in any other channel, with merchants not associated with the indicator, or any other instance will be rejected.

In the present solution, a separation of tokenized and non-tokenized payments is identified, where tokenized payments use a first rule set where tokenized payments are assuming to be pre-authorized, and where non-tokenized payments use a different second rule set. In some implementations, all payments, whether tokenized or non-tokenized, may be evaluated for whether pre-authorization is available and allowed when no card present transactions are received, as well as whether the current transaction qualifies or meets the criteria for such pre-authorization.

The present solution provides significant benefits to users and merchants, in that merchants and banks can use instant credit decisions to generate and provide card information to users and merchants for immediate use (e.g., using a new merchant co-branded credit card). The described solution can then allow merchants associated with the new credit to specifically manage and authorize purchases using these new accounts, where cards associated with those accounts are otherwise not activated. Further, logic is defined to allow those purchases with the new credit line only through particular channels, thereby providing additional protection to the merchants to ensure only a specific set of payment transactions are approved when the transaction requests are received through specific channels. The solution also allows customers to immediately use their new credit without requiring a new card to be activated or even received, greatly reducing the amount of time in which the payment instrument or account can be used.

In general, as the new accounts are opened that take advantage of this solution, non-tokenized payment information can be provided to the merchant to be associated with particular customer accounts. Since the customer may not have their payment details, the non-tokenized payment information can be accessed and processed via the merchant account, and transaction requests can be triggered through interactions at the appropriate merchant channels. The non-tokenized payment information is then submitted with the transaction request associated with the customer, and the appropriate financial institution logic can be applied, allowing or declining the request.

Example techniques for providing instant credit decisions and provisioning can be found, for example, in U.S. patent application Ser. No. 16,161,269 filed Oct. 16, 2018, entitled "Integrated Credit Application and Provisioning Solution," U.S. patent application Ser. No. 16,135,278 filed Sep. 19, 2018, entitled "System and Method for Integrated Application and Provisioning," and U.S. patent application Ser. No. 16,135,272 filed Sep. 19, 2018, entitled "System and Method for Integrated Application and Provisioning," each of which are hereby incorporated by reference herein.

In the described solution herein, any suitable method for offering, evaluating, and issuing new credit and accounts may be used, and is not limited to the embodiments described in the applications incorporated by reference. In particular, the presently described solution considers that a new account has been opened with a financial institution that relates to a particular customer, and that the new account corresponds to a particular merchant (e.g., as a co-branded product). The credit or payment account at the financial institution is then opened with a particular indicator (e.g., flag, tiered watch identifier, etc.) used to indicate that the new account has been opened, but that the payment card has not been activated.

Turning to the illustrated example implementation, FIG. 1 is a block diagram illustrating an example system 100 for pre-authorizing transactions using unactivated payment instruments at specific merchants. The system 100 can allow new credit accounts to be created and, before an associated card is activated, to use those new accounts at particular merchants without a card being present and/or without the card being activated. In other words, the time from the issuance of new credit to the use of a new credit account can be greatly sped up, while at the same time providing protections to the associated customer in that only those non-card transactions performed at specific merchants and via specific transaction channels (e.g., an e-Commerce channel) will be authorized and allowed. Further, non-card transactions at any other non-pre-authorized channel or merchant will be declined.

Specifically, the illustrated implementation is directed to a solution where, after the new credit account is generated, non-tokenized card or payment information 152 associated with the card and customer account 150 is provided to a pre-authorized merchant system 140. Using the e-Commerce application 146, or any other suitable payment rail, the non-tokenized card information 152 can be used to process a purchase or other transaction in association with a no card present (NCP) transaction. A transaction authorization request is then transmitted, via network 130, to financial system 102 of an organization who issued the credit to determine whether to authorize the transaction. Upon receipt, the transaction processor 112 can use an authorization decision engine 114 to determine whether the requested transaction is associated with a pre-authorization indicator (e.g., authorization indicator 127). If so, a set of indicator-specific authorization rules 118 can be used by the decision engine 114 to determine whether the transaction meets the pre-authorization requirements. Those requirements may be used to evaluate whether the particular merchant is pre-authorized based on the authorization indicator 127, as well as whether the transaction channel through which the transaction was attempted is pre-authorized. If not, a set of standard authorization rules 120 may be applied, or the transaction may simply be rejected. Using the solution, the authorization indicator 127 can be used to determine whether particular NCP transactions are to be authorized by applying predetermined rule sets to only those transactions where the card has not been activated, ensuring that only the parties and methods associated with the pre-authorization are authorized.

In general, system 100 allows the illustrated components to share and communicate information across devices and systems (e.g., merchant system 140, financial system 102, client 160, and point-of-sale (POS) systems 180, among others, via network 130). As described herein, any of the systems, including the financial system 102 and/or merchant system 140 may be cloud-based components or systems (e.g., partially or fully), while in other instances, non-cloud-based systems may be used. In some instances, non-cloud-based systems, such as on-premise systems, client-server applications, and applications running on one or more client devices, as well as combinations thereof, may use or adapt the processes described herein. Although components are shown individually, in some implementations, functionality of two or more components, systems, or servers may be provided by a single component, system, or server.

As used in the present disclosure, the term "computer" is intended to encompass any suitable processing device. For example, financial system 102, merchant system 140, and client 160 may be or may not be associated with any computer or processing devices such as, for example, a blade server, general-purpose personal computer (PC), Mac®, workstation, UNIX-based workstation, or any other suitable device. Moreover, although FIG. 1 illustrates a single financial system 102, financial system 102 can be implemented using a single system or more than those illustrated, as well as computers other than servers, including a server pool. Other illustrated components may be similarly separated, where suitable. In other words, the present disclosure contemplates computers other than general-purpose computers, as well as computers without conventional operating systems. Similarly, the client 160 may be any system that can request data and/or interact with the merchant system 140 and the financial system 102. The client 160, also referred to as client device 160, in some instances, may be a desktop system, a client terminal, or any other suitable device, including a mobile device, such as a smartphone, tablet, smartwatch, or any other mobile computing device. In general, each illustrated component may be adapted to execute any suitable operating system, including Linux, UNIX, Windows, Mac OS®, Java™, Android™, Windows Phone OS, or iOS™, among others. The client 160 may include one or more financial institution-specific applications executing on the client 160 (e.g., a financial application), or the client 160 may include one or more Web browsers or web applications that can interact with particular applications executing remotely from the client 160, such as client application 168, among others.

As noted, the financial system 102 provides a backend system associated with a financial institution used to manage credit and other financial customer accounts, where the credit accounts are opened and managed at or associated with the financial institution or system 102. Information about various accounts can be stored in the credit accounts 122, and authorization decisions regarding particular transaction attempts can be made by the system 102.

In some instances, apply-and-buy scenarios may be applied, similar to those prior patent applications previously incorporated by reference. In the described solution, when a new account is opened by the credit management application 108, the corresponding credit account 122 can be associated with a set of user login credentials 123, a personal account number (PAN) 124, which may be identical to the account number of the new credit account 122, or may be an alternative identifier to be used in transactions or associated with a card or other payment instrument associated with the credit account 122. It should be noted that although the term "credit account" is used in reference to credit account 122, any other suitable type of financial account allowing customers to purchase or otherwise transact goods and services via payment and transaction systems can be used. For example, the credit account 122 may be associated with a debit account, a checking account, a money market account, a gift card account, or any other suitable account. Each credit account 122 may be associated with account data 125, which can identify current account balances, an overall credit or total funds available, repayment information, and other account-related data managed by the financial system 102. The credit account 122 may also be associated with a user ID corresponding to one or more customer accounts 150 at particular merchant systems 140, where the link between the credit account 122 and customer account 150 may be provided for sharing of card or payment information.

As illustrated, the credit account 122 also includes an authorization indicator 127, where the authorization indicator 127 can be used as a preliminary identifier of whether one or more transactions associated with a particular credit account 122 may be pre-authorized before the corresponding account or card on the account is activated. In instances where a card is being provided but one or more NCP transactions are to be authorized, such as in an apply-and-buy situation, the authorization indicator 127 can be set or associated with a particular value to identify one or more indicator-specific authorization rules 118 to be applied. In some instances, the authorization indicator 127 may be associated with a tiered warning system provided by a payment processor or account manager, such as TSYS's Tiered Watch system. The rules associated with a particular indicator 127 can be generally associated with the fact that a flag or indicator is set, or may be further specified with additional information to allow for additional rule sets to be defined. For example, in some instances, a flag for the authorization indicator 127 may be set to on or off, while in others, a value associated with the authorization indicator 127 can be assigned to specify a particular set of merchants and channels for which transactions are pre-authorized. For example, a first value of "X" in the authorization indicator 127 may correspond to a rule set X in the indicator-specific authorization rules 118, where purchases from Amazon.com using an e-Commerce channel are allowed. In contrast, a value of "Y" in the authorization indicator 127 may correspond to a rule set Y in the indicator-specific authorization rules 118, where purchases from BestBuy.com (and not Best Buy's physical stores) are allowed. Any suitable number of values and rule sets may be used.

As illustrated, each credit account 122 may include an indication of the activation status 128 of the corresponding credit account 122 and/or a card associated with the account 122. Once a card is activated, normal processing may be performed without the requirement for pre-authorization, and purchases from any suitable merchant can be allowed if the accounts are not in a derogatory status and funds are available.

As illustrated, the financial system 102 includes or is associated with interface 104, processor(s) 106, credit management application 108, transaction processor 112, and memory 116. While illustrated as provided by or included in the financial system 102, parts of the illustrated contents may be separate or remote from the financial system 102, or the financial system 102 may be distributed.

The interface 104 of the financial system 102 is used by the financial system 102 for communicating with other systems in a distributed environment—including within the environment 100—connected to the network 130, e.g., merchant system 140, client 160, and POS 180, as well as other systems communicably coupled to the illustrated financial system 102 and/or network 130. Generally, the interface 104 comprises logic encoded in software and/or hardware in a suitable combination and operable to communicate with the network 130 and other components. More specifically, the interface 104 may comprise software supporting one or more communication protocols associated with communications such that the network 130 and/or interface's hardware is operable to communicate physical signals within and outside of the illustrated environment 100. Still further, the interface 104 may allow the financial system 102 to communicate with the client 160 and/or other portions illustrated within the financial system 102 to perform the operations described herein.

Network 130 facilitates wireless or wireline communications between the components of the environment 100 (e.g., between the financial system 102, merchant system 140, the client(s) 160, etc.), as well as with any other local or remote computers, such as additional mobile devices, clients, servers, or other devices communicably coupled to network 130, including those not illustrated in FIG. 1. In the illustrated environment, the network 130 is depicted as a single network, but may be comprised of more than one network without departing from the scope of this disclosure, so long as at least a portion of the network 130 may facilitate communications between senders and recipients. In some instances, one or more of the illustrated components (e.g., the merchant system 140, the financial system 102, etc.) may be included within or deployed to network 130 or a portion thereof as one or more cloud-based services or operations. The network 130 may be all or a portion of an enterprise or secured network, while in another instance, at least a portion of the network 130 may represent a connection to the Internet. In some instances, a portion of the network 130 may be a virtual private network (VPN). Further, all or a portion of the network 130 can comprise either a wireline or wireless link. Example wireless links may include 802.11a/b/g/n/ac, 802.20, WiMax, LTE, 5G, and/or any other appropriate wireless link. In other words, the network 130 encompasses any internal or external network, networks, subnetwork, or combination thereof operable to facilitate communications between various computing components inside and outside the illustrated environment 100. The network 130 may communicate, for example, Internet Protocol (IP) packets, Frame Relay frames, Asynchronous Transfer Mode (ATM) cells, voice, video, data, and other suitable information between network addresses. The network 130 may also include one or more local area networks (LANs), radio access networks (RANs), metropolitan area networks (MANs), wide area networks (WANs), all or a portion of the Internet, and/or any other communication system or systems at one or more locations.

The financial system 102, as illustrated, includes one or more processors 106. Although illustrated as a single processor 106 in FIG. 1, multiple processors may be used according to particular needs, desires, or particular implementations of the environment 100. Each processor 106 may be a central processing unit (CPU), an application specific integrated circuit (ASIC), a field-programmable gate array (FPGA), or another suitable component. Generally, the processor 106 executes instructions and manipulates data to perform the operations of the financial system 102. Specifically, the processor 106 executes the algorithms and operations described in the illustrated figures, as well as the various software modules and functionality, including the functionality for sending communications to and receiving transmissions from the client 160, as well as interacting with the merchant systems 140 and POS systems 180, as well as to other devices and systems. Each processor 106 may have a single or multiple core, with each core available to host and execute an individual processing thread. Further, the number of, types of, and particular processors 106 used to execute the operations described herein may be dynamically determined based on a number of requests, interactions, and operations associated with the financial system 102.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others.

As described, the credit management application 108 may be any suitable application, program, module, or other software application that allows for the management of one or more credit and/or other financial accounts, such as credit accounts 122. The credit management application 108 may be used to receive and process applications for new credit and other financial accounts, including those associated with or linked to particular merchant systems 140. The credit management application 108 may manage credit and account decisions, including the amounts of credit to be issued in response to an application, as well as performing creditworthiness and fraud-related analyses during the credit issuance process. Once the credit is issued, the credit management application 108 can be used to manage the accounts by the financial system 102. In some instances, customers may be able to log in and interact with their accounts via a customer-facing portion of the credit management application 108. Those portions may provide customers the ability to review their transaction history, update their information, and pay or manage their bills and account.

In response to the credit management application 108 approving and opening the new account, credit account 122 is opened. The credit management application 108 may act as a master account management system, and can perform credit provisioning and management within the financial system 102. In some instances, the credit management application 108, or portions thereof, may be a credit management system offered by TSYS or another vendor. As described, the new account 122 and related information can be generated. If the particular credit line or account is associated with a co-branded partner, or is opened for immediate purchase with one or more merchants, an authorization indicator 127 as previously described can be associated with the account 122, allowing for a particular set of pre-authorized purchases and transactions to be performed with particular merchants via particular channels. The activation status 128 of the account 122 can be set to unactivated so that the authorization indicator 127 is considered when transaction requests are received.

The credit management application 108 may include a card activation module 110, where activation operations associated with the new credit account 122 and any associated payment instruments or cards can be managed. In some instances, customers may call in to activate a card using a number received when the card is received. The phone-based system can connect to the card activation module 110 to indicate that the activation has occurred, and the activation status 128 of the card and account can be modified. In other instances, customers can log into their account 122 (e.g., via client application 168), and can activate their cards online.

Transaction processor 112 of the financial system 102 can be used to determine whether particular transaction request attempts should be allowed or rejected. In those instances, transaction requests from the merchant systems 140, one or more POSs 180, or any other suitable transaction system can be received at the financial system 102 or a related system. Based on the request, a determination can be made as to whether the transaction should be allowed and processed. Where transactions are approved, the transaction processor 112 can send an authorization and the transaction at the other system can be performed. If rejection, a notification of the rejection can be provided, and in some cases, a reason for the rejection. In prior solutions, transaction attempts received before a card is activated or has an activation status 128 indicating that a card has been activated would be denied. In the present solution, some specific types of transactions may be approved even though the corresponding card has not yet been authorized based on a set of indicator-specific authorization rules 118 processed by the transaction processor 112, and in particular, its authorization decision engine 114.

The authorization decision engine 114 can be a rule execution engine or other processor that considers transaction attempts of particular types—that is, transaction attempts associated with a non-tokenized set of card information. If tokenized card information or payment account information is received, the transaction processor 112 can perform a standard set of authorization rules 120. Similarly, if non-tokenized card information is received, but the card associated with the transaction has already been activated, then the standard set of authorization rules 120 can be used, as well. However, if a non-tokenized set of card information is received and the card has not been activated, the authorization decision engine 114 can analyze the account's authorization indicator 127 to determine whether a particular transaction should be allowed despite the account 122 not yet being activated according to its activation status 128.

As described above, the authorization indicator 127 may be a general flag indicating that pre-authorization should be considered, or the authorization indicator 127 can be associated with a particular value to identify one of a plurality of indicator-specific authorization rules 118 to be considered. In other instances, the authorization indicator 127 may be a general flag, but additional considerations can be used to identify the particular card type and one or more card type-specific rules to be applied. In this instance, a single authorization indicator 127 value (e.g., on or off), can be used to trigger the indicator-specific authorization rules 118, and additional data regarding the card or account 122 itself can be used to determine which of those indicator-specific authorization rules 118 to apply.

Any number of suitable indicator-specific authorization rules 118 can be defined and applied in the pre-authorization determination. In some instances, pre-authorization and the indicator-specific authorization rules 118 may be limited to a particular card type (e.g., an Amazon co-branded credit account), such that only transactions for that particular card may be considered, and only from particular merchants (e.g., the co-brand of Amazon) through one or more particular transaction channels. In other instances, different types of cards and accounts may be associated with the ability to pre-authorize particular transactions. The transaction processor 112 can apply those indicator-specific authorization rules 118 to confirm that the merchant system 140 associated with the request is included in the approved pre-authorization, as well as the transaction channel used. For example, if a particular merchant system 140 is pre-authorized, but the channel used to attempt the transaction is not (e.g., in store manual entry), the transaction can be rejected. This allowance can both allow only certain transactions to be performed prior to activation with merchants associated with a card, while also ensuring that NCP transactions that are not secure and confidently protected (e.g., manual NCP transactions entered at a POS of a brick-and-mortar store).

Memory 116 of the financial system 102 may represent a single memory or multiple memories. The memory 116 may include any memory or database module and may take the form of volatile or non-volatile memory including, without limitation, magnetic media, optical media, random access memory (RAM), read-only memory (ROM), removable media, or any other suitable local or remote memory component. The memory 116 may store various objects or data, including financial data, user and/or account information, administrative settings, password information, caches, applications, backup data, repositories storing business and/or dynamic information, and any other appropriate information associated with the financial system 102, including any parameters, variables, algorithms, instructions, rules, constraints, or references thereto. Additionally, the memory 116 may store any other appropriate data, such as VPN applications, firmware logs and policies, firewall policies, a security or access log, print or other reporting files, as well as others. While illustrated within the financial system 102, memory 116 or any portion thereof, including some or all of the particular illustrated components, may be located remote from the financial system 102 in some instances, including as a cloud application or repository, or as a separate cloud application or repository when the financial system 102 itself is a cloud-based system. As illustrated and previously described, memory 116 includes a plurality of credit accounts 122 associated with customers, where each credit account 122 may be associated with a corresponding user ID 126, the set of user login credentials 123, a PAN 124, a set of account data 125, a potential authorization indicator 127, and an activation status 128, among others. Further, one or more indicator-specific authorization rules 118 and standard authorization rules 120 may be stored in memory 116 to allow the transaction processor 112 and authorization decision engine 114 to perform their analysis of whether a particular transaction should be approved. Additional and/or alternative information may be stored in or associated with memory 116.

While not illustrated herein, once a new credit account 122 is generated, the financial system 102 may trigger a physical card generation process, where a physical card is generated and can be physically delivered to the user. Any suitable process for card generation can be used, and can allow the user to use the new credit account offline and at locations where approved by the indicator-specific authorization rules 118. Once received, the physical card can be activated using the card activation module 110.

The one or more merchant systems 140 may be associated with any suitable merchants, including providers of goods and/or services, including both online and brick-and-mortar stores. In some instances, the merchant systems 140 can be associated with particular merchants providing co-branded or loyalty-based credit cards in association with a financial institution associated with the financial system 102. In response to the creation of the credit account 122, the merchant system 140 can be provided with a set of non-tokenized card information 152 representing the new card being issued, even before the card has been created and/or activated. In those instances, the particular merchant associated with the merchant system 140 may be included in or associated with a particular indicator-specific authorization rule 118, such that a transaction through a particular channel associated with that merchant and merchant system 140 can be pre-authorized at the financial system 102 and any attempted transactions allowed to process even while the card has yet to be activated.

As illustrated, the merchant system 140 may include an interface 142 for communication (similar to or different from interface 104), at least one processor 144 (similar to or different from processor 106), an e-Commerce application 146, and a memory 148 (similar to or different from memory 116). The illustrated merchant system 140 is intended to encompass any computing device such as a desktop computer, laptop/notebook computer, cloud computing system, tablet computing device, server, workstation, one or more processors within these devices, or any other suitable processing device. In general, the merchant system 140 and its components may be adapted to execute any operating system, including Linux, UNIX, Windows, Mac OS®, Java™, Android™, or iOS. In some instances, the merchant system 140 may comprise a computer that includes an input device, such as a keypad, touch screen, or other device(s) that can interact with one or more e-Commerce applications 146, as well as point-of-sale applications, where appropriate. In some instances, the e-Commerce application 146 may represent a web page, web site, or web application, including one accessed using a dedicated mobile application, where customers can add items from a catalog or interactive web site to a shopping cart 154, and can allow those customers to complete the transaction using one or more credit cards. In particular instances, customers can use the credit account 122 by using a set of non-tokenized card information 152 provided to the merchant system 140 at or after a credit approval and issuance process. In general, the merchant system 140 may be any computing device operable to communicate with the financial system 102, client(s) 160, and/or other components via network 130, as well as with the network 130 itself, using a wireline or wireless connection. In general, merchant system 140 comprises an electronic computer device operable to receive, transmit, process, and store any appropriate data associated with the environment 100 of FIG. 1.

As illustrated, memory 148 includes one or more customer accounts 150, where particular customer accounts 150 can, in some instances, be associated with the non-tokenized card information 152 for the credit account 122. In some instances, tokenized card information (not shown) may also be included and used, such as after a card is activated. Memory 148 may also store a shopping cart 154 associated with items and/or services to be purchased by the customer associated with the customer account 150, such as those added using the e-Commerce application 146. When the customer is ready to finalize a transaction, the e-Commerce application 146 can trigger an attempted transaction by sending a transaction request to the financial system 102. If the transaction processor 112 approves the request, the transaction can be performed and finalized. When transmitting the transaction request, the merchant system 140 can include a set of information about the transaction to the financial system 102, including a set of merchant information 156 that can be included in the request or as metadata associated with the request. The information can include a channel through which the transaction is attempted (e.g., via e-Commerce/online or in-person through a manual entry of card, etc.). Using that information, the transaction processor 112 can determine how to proceed.

In some instances, the merchant system 140 may be specifically associated with only online transactions such that only a single channel may be associated with the system 140. In other instances, however, the merchant system 140 may include both online and in person transactions, as well as different merchants or entities within an organization or company, such that different types of transaction channels and entities may be used from the single merchant system 140. In those instances, the information provided with the transaction to the transaction processor 112 can be used to determine whether the transaction will be allowed based on the specifics of the transaction.

As illustrated, one or more clients 160 may be present in the example system 100. Each client 160 may be associated with a particular customer, or may be accessed by multiple customers, where a particular customer is associated with a current session or interaction at the client 160. Client 160 may be a client device at which a particular customer is linked or associated, or a client device through which the particular customer, using a client application 168, can interact with the financial system 102 and/or the merchant system 140. As illustrated, the client 160 may include an interface 162 for communication (similar to or different from interfaces 104 and 142), at least one processor 164 (similar to or different from processors 106 and 144), a graphical user interface (GUI) 166, client application 168, and a memory 170 (similar to or different from memories 116 and 148).

The illustrated client 160 is intended to encompass any computing device such as a desktop computer, laptop/notebook computer, mobile device, smartphone, personal data assistant (PDA), tablet computing device, one or more processors within these devices, or any other suitable processing device. In general, the client 160 and its components may be adapted to execute any operating system, including Linux, UNIX, Windows, Mac OS®, Java™, Android™, or iOS. In some instances, the client 160 may comprise a computer that includes an input device, such as a keypad, touch screen, or other device(s) that can interact with one or more client applications 168, such as one or more mobile applications, including a web browser, mobile wallet or other banking application, and an output device that conveys information associated with the operation of the applications and their application windows to the user of the client 160. Such information may include digital data, visual information, or a GUI 166, as shown with respect to the client 160. Specifically, the client 160 may be any computing device operable to communicate with the financial system 102, the merchant system 140 (e.g., by accessing the e-Commerce application 146), other clients 160, other POS systems 180, and/or other components via network 130, as well as with the network 130 itself, using a wireline or wireless connection. In general, client 160 comprises an electronic computer device operable to receive, transmit, process, and store any appropriate data associated with the environment 100 of FIG. 1.

The client application 168 executing on the client 160 may include any suitable application, program, mobile app, or other component. Client application 168 can interact with the financial system 102, one or more merchant systems 140 (e.g., to browse and/or purchase goods and services, etc.), or other systems, via network 130. In some instances, the client application 168 may be a web browser, where the functionality of the client application 168 may be realized using a web application or website the user can interact with via the client application 168. In other instances, the client application 168 may be a remote agent, component, or client-side version of the financial system 102, a merchant system 140 or one of its e-Commerce applications 146, or a dedicated application associated with either the financial system 102 or the merchant system(s) 140. In some instances, the client application 168 may interact directly with the financial system 102 or merchant system(s) 140 or portions thereof. The client application 168 may be used to view or interact with the financial system 102 and/or the e-Commerce application 146 of the merchant system(s) 140. In some instances, the client application 168 may be used independently to perform additional operations, or may be directly associated with either the financial system 102 or the merchant system 140.

GUI 166 of the client 160 interfaces with at least a portion of the environment 100 for any suitable purpose, including generating a visual representation of any particular client application 168, and/or the content associated with any components of the financial system 102 and/or the merchant system 140. In particular, the GUI 166 may be used to present screens and information associated with interacting with the credit management application 108 and/or interacting with the e-Commerce application 146, among others. GUI 166 may also be used to view and interact with various web pages, applications, and web services located local or external to the client 160. Generally, the GUI 166 provides the user with an efficient and user-friendly presentation of data provided by or communicated within the system. The GUI 166 may comprise a plurality of customizable frames or views having interactive fields, pull-down lists, and buttons operated by the user. In general, the GUI 166 is often configurable, supports a combination of tables and graphs (bar, line, pie, status dials, etc.), and is able to build real-time portals, application windows, and presentations. Therefore, the GUI 166 contemplates any suitable graphical user interface, such as a combination of a generic web browser, a web-enable application, intelligent engine, and command line interface (CLI) that processes information in the platform and efficiently presents the results to the user visually.

As illustrated, memory 170 of client 160 may include a set of stored merchant account information 172 (e.g., login information for the merchant system) and a set of tokenized card information 174. The merchant account information 172 can be used to log into particular merchant systems 140, with multiple sets of information stored for different merchants. When logging in to those merchant systems 140, particularly where the customer has not received the card information associated with a new credit account 122, the stored merchant account information 172 can be used to log into the merchant system 140 and perform pre-authorized transactions at the merchant system 140 using the non-tokenized card information 152.

As further illustrated, one or more POS systems 180 may also be included in the environment 100. The POS systems 180 illustrated here are meant to illustrate one or more systems, such as at brick-and-mortar locations, where payment cards or other credentials and payment instruments can be provided for potential transactions. The POS systems 180 can obtain and/or use tokenized or non-tokenized card information, which may be used with a NCP transaction or a card present transaction. In either event, because those systems are not associated with a particular indicator-specific authorization rule 118, any non-tokenized transactions attempted prior to the corresponding card is activated will be rejected, as they are not pre-authorized according to the solution described herein. Any tokenized transactions may be managed by a separate process, and may or may not be authorized.

While portions of the elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2:
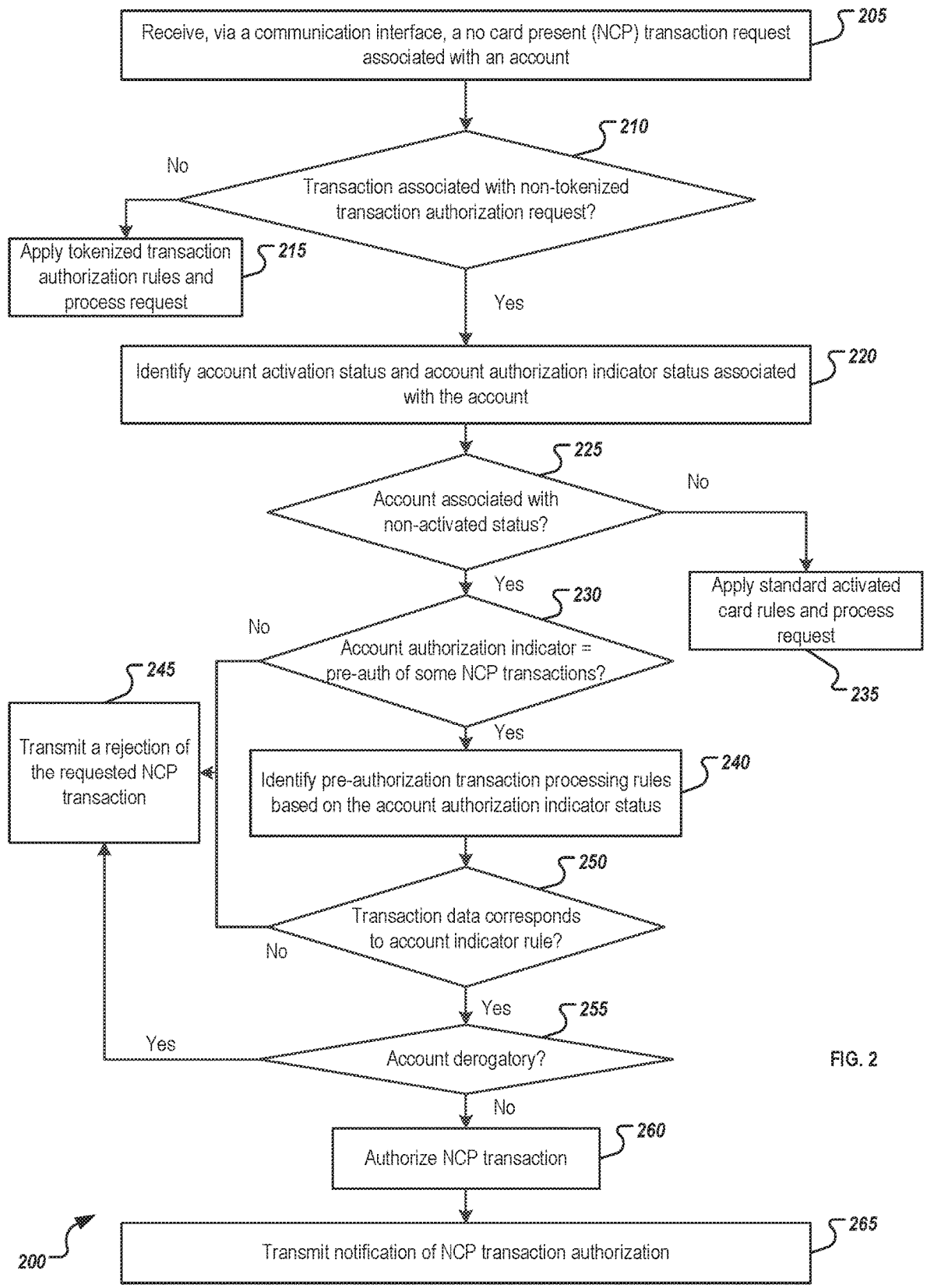
FIG. 2 is a flow diagram of an example method for pre-authorizing transactions using unactivated payment instruments at specific merchants in one example implementation.

FIG. 2 is a flow diagram of an example method 200 for pre-authorizing transactions using unactivated payment instruments at specific merchants in one example implementation. However, it will be understood that method 200 may be performed, for example, by any other suitable system, environment, software, and hardware, or a combination of systems, environments, software, and hardware as appropriate.

At 205, a no card present (NCP) transaction request associated with a particular customer account is received via a communication interface. In some instances, the NCP transaction request may include or be associated with information about the transaction being requested, including but not limited to, information about the particular merchant from which the transaction was received, an indication of a channel (e.g., in person, online, e-Commerce, etc.) through which the transaction was attempted or performed, customer account information, a set of account information associated with the transaction, and an amount associated with the attempted transaction.

At 210, a determination is made as to whether the transaction request is associated with a non-tokenized transaction authorization request. In other words, whether the account data provided by or associated with the customer is received in a tokenized or non-tokenized format. If the transaction information is received in the tokenized manner, then method 200 continues at 215, where a set of tokenized transaction authorization rules can be applied and the request can be processed. Such processing operations are outside the scope of the current disclosure. If, however, it is determined that the transaction data associated with the customer is received as non-tokenized data, then method 200 continues to 220.

At 220, an account activation status and an account authorization indicator status associated with the account are identified, where that information can be used to identify how to process the transaction request.

At 225, a determination is made as to whether the account activation status is associated with a non-activated or unactivated status. For example, if a payment instrument or payment card associated with the account has not been activated, then the described pre-authorization can be used, and method 300 can continue to 230 where further determinations can be made. If, however, the account has been activated, then method 200 can continue at 235, where a standard set of activated account rules can be applied and the request processed accordingly. As the account has been activated, there is no need to consider the pre-authorization request and criteria.

At 230, a determination is made as to whether the identified account authorization status indicates that at least some NCP transactions are pre-authorized. If not, method 200 continues at 245, where a rejection of the requested NCP transaction can be generated and transmitted to the requesting system, such as the merchant system associated with the transaction. Alternatively, if at least some NCP transactions are authorized, then method 200 continues at 240.

At 240, a set of pre-authorization transaction processing rules are identified based on the account authorization indicator status associated with the account. In some instances, the account authorization indicator may identify that yes, some pre-authorizations are allowed, or that no, no pre-authorizations are allowed. In those instances, one set of rules may be identified and compared to the transaction data and details to determine if a particular transaction is allowed. In other instances, however, different values may be used for different types of account authorization indicators to indicate particular pre-authorization rules and criteria to be considered and evaluated. For example, different types of cards may allow different types of pre-authorizations, such as for different merchants and for different types of channels through which the transactions may be performed in order for the requested transaction to be allowed.

At 250, a determination is made as to whether the transaction data associated with the transaction request matches or corresponds to the identified pre-authorization rules. If not, method 200 returns to 245, where a rejection of the requested NCP transaction can be generated and transmitted. However, if the transaction request matches or corresponds to a particular pre-authorized interaction, method 200 can continue at 255, where a determination is made as to whether the account is in a derogatory status or otherwise is not able to complete the transaction. If that determination indicates the transaction should not be completed, then method 200 returns to 245. If, however, the determination indicates that the account is not derogatory, method 200 continues to 260, where the NCP transaction is determined to be authorized. At 265, a notification of the NCP transaction authorization can be transmitted, via the communications interface, to the requesting system, and corresponding actions associated with authorizing the transaction request can be performed, including debiting or charging the account associated with the transaction.

Figure 3:
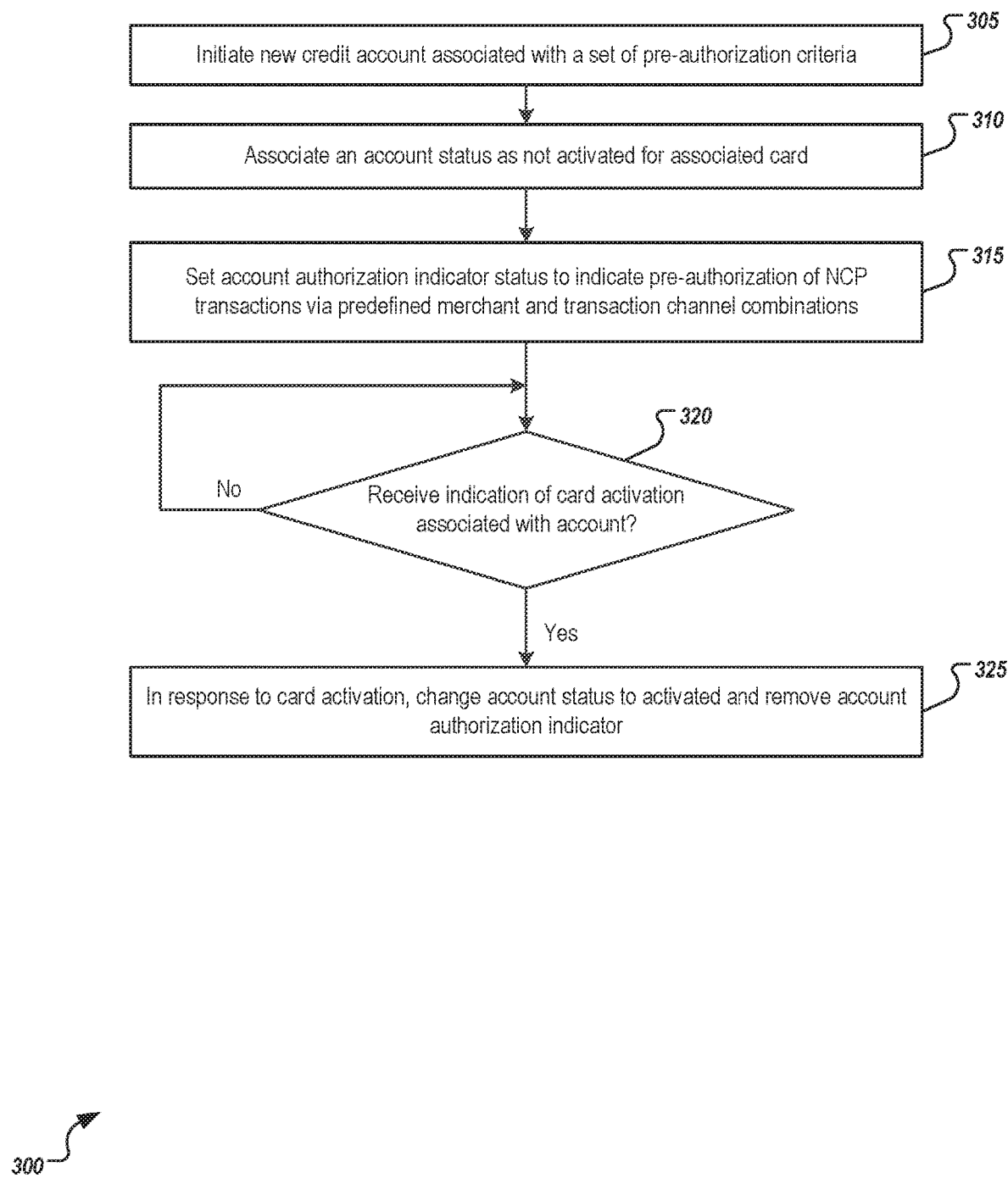
FIG. 3 is a flow diagram of an example method for pre-authorizing transactions using unactivated payment instruments at specific merchants from a perspective of a financial institution in one example implementation.

FIG. 3 is a flow diagram of an example method 300 for pre-authorizing transactions using unactivated payment instruments at specific merchants from a perspective of a financial institution in one example implementation. However, it will be understood that method 300 may be performed, for example, by any other suitable system, environment, software, and hardware, or a combination of systems, environments, software, and hardware as appropriate.

At 305, a new credit account associated with a set of pre-authorization criteria can be initiated. The pre-authorization can include specific merchants and channels through which NCP transactions may be allowed prior to card activation.

At 310, an account status for the new credit account can be assigned or associated with an indication that a corresponding card or payment instrument of the account has not yet been activated. Further, based on the pre-authorization criteria, at 315 an account authorization indicator status can be set to indicate pre-authorization of at least some NCP transactions associated with the account. In some instances, a yes/no flag may be set in the account, while in others, a particular value may be identified to link to the pre-authorization criteria and rules. Those pre-authorization criteria can be used to identify, for the particular account, which merchants and transaction channel combinations may be pre-authorized. When transaction requests are received, those particular combinations can be compared to the actual transaction data to determine if the particular transaction request should be allowed.

At 320, a determination is made as to whether an indication of a card or payment instrument activation has been received for the account, such as in response to an activation performed by the customer by phone or via an online account activation once the card or payment instrument is received. If not, method 300 waits until such an indication is received. If such an indication has been received, however, method 300 continues at 325, wherein, in response to the card activation, the account activation status is changed to activated and, optionally, the corresponding account authorization indicator can be removed. Once that is done, any attempted transactions associated with the account using the card can be handled via standard processing of activated accounts, and any prior pre-authorizations can be removed or not considered as the account is now activated.

FIG. 4 illustrates several example transactions handled by the described transactions, including their associated information, and provides example responses and reasoning for their authorization or rejection. Transactions 405, 410, and 415 may each be received at the financial system 102, for example, and each can be evaluated to determine whether such transactions are allowed to be performed based on one or more pre-authorization criteria. In the present example, only one pre-authorization rule may be in effect, which identifies that transactions performed with merchant 23863 (Amazon) through an e-Commerce transaction can be pre-authorized based on the issuance of a new credit account for a co-branded Amazon.com card. A particular customer's account may be numbered "xyz123" for purposes of this example.

In the first example transaction 405, the transaction request includes a payment amount of $200 is indicated for account xyz123, where the merchant associated with the request is merchant ID 23863 (corresponding to Amazon.com) and the transaction channel is an e-Commerce channel. Based on the fact that the account xyz123 is associated with a non-activated card, and an authorization indicator corresponding to the Amazon.com pre-authorizations is present, the transaction is allowed.

In the second example transaction 410, the transaction request is associated with account "abc125." Account abc125 corresponds to a non-activated card, however, the account is not associated with an authorization indicator. In some instances, no authorization indicator at all may be associated with the account, while in others, an authorization indicator that does not correspond to the transaction data (e.g., Amazon.com and e-Commerce channel) may be present, such as one that allows online transactions to be pre-authorized at BestBuy.com. As a result of the indicator either not being present or not matching the transaction data, the second transaction 410 is declined.

The third example transaction 415 is associated with the original account of xyz123, which is non-activated and associated with an authorization indicator that corresponds to online transactions at Amazon.com. The transaction at issue, however, relates to a point-of-sale transaction attempted at Whole Foods (merchant ID 23864). Because the transaction is not through the pre-authorized online transactions, the transaction is declined. In addition, because the transaction may be a no card present transaction performed at a POS, the transaction may also be declined, as the corresponding card has not been activated prior to the attempt.

The preceding figures and accompanying description illustrate example processes and computer-implementable techniques. However, system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, the described systems and flows may use processes and/or components with or performing additional operations, fewer operations, and/or different operations, so long as the methods and systems remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A system comprising:
   a communications interface;
   at least one memory storing instructions, a repository storing a plurality of credit accounts, and a repository storing a set of pre-authorization rules for authorizing no card present (NCP) transactions prior to activation of a payment instrument associated with a corresponding one of the plurality of credit accounts, wherein each credit account is associated with a customer, wherein each credit account is associable with a first indicator that indicates whether the payment instrument associated with the corresponding credit account has been activated, and wherein each credit account is associable with a second indicator that indicates whether at least one pre-authorization rule has been associated with the corresponding credit account, wherein at least some of the credit accounts in the plurality of credit accounts are opened after an instant credit decision and are made available for use by customers and merchants in limited transactions prior to physical versions of the payment instructions corresponding to those credit accounts being activated; and
   at least one hardware processor interoperably coupled with the at least one memory and the communications interface, wherein the instructions instruct the at least one hardware processor to perform operations comprising:
- receiving, via the communications interface and from a merchant system, a first signal comprising a transaction request associated with an NCP transaction associated with a first credit account in the plurality of credit accounts, wherein the transaction request is triggered by an application of the merchant system and is associated with a set of transaction data comprising an identifier of a channel through which the requested transaction is performed;
- determining that the first credit account is associated with an unactivated payment instrument based on the first indicator included in the repository storing the plurality of credit accounts;
- determining that the first credit account is associated with a second indicator indicating that at least one pre-authorization rule is associated with the first credit account;
- identifying a set of pre-authorization criteria associated with the at least one pre-authorization rule associated with the first credit account;
- comparing the set of transaction data associated with the transaction request to the identified set of pre-authorization criteria to generate a comparison result;
- determining, based on the comparison result, that the set of transaction data associated with the transaction request satisfies the identified set of pre-authorization criteria;
- generating a transaction authorization for the transaction request received through the channel identified as a pre-authorized transaction channel and satisfying the identified set of pre-authorization criteria; and
- transmitting, via the communications interface and to the merchant system, a second signal comprising the transaction authorization corresponding to the received transaction request.

2. The system of claim 1, wherein, in response to determining that set of transaction data associated with the transaction request does not satisfy the identified set of pre-authorization criteria, the instructions instruct the at least one hardware processor to reject the transaction request and transmit, via the communications interface and to the merchant system, a third signal comprising a transaction rejection corresponding to the received transaction request.

3. The system of claim 1, wherein the determination of whether the first credit account is associated with a second indicator indicating that at least one pre-authorization rule is associated with the first credit account is only performed in response to determining that the set of transaction data includes a non-tokenized set of payment data associated with the first credit account.

4. The system of claim 3, wherein the non-tokenized set of payment data associated with the first credit account is stored at a merchant system associated with the transaction request and associated with a customer account managed by the merchant system, wherein the transaction associated with the transaction request is initiated by the customer when the customer does not have access to the non-tokenized set of payment data associated with the first credit account.

5. The system of claim 1, wherein the set of transaction data comprises an identification of a merchant associated with the transaction request.

6. The system of claim 5, wherein the set of pre-authorization criteria associated with the at least one pre-authorization rule associated with the first credit account comprises an identification of at least one pre-authorized merchant and at least one pre-authorized transaction channel corresponding to each of the at least one pre-authorized merchants, and wherein determining that the set of transaction data associated with the transaction request satisfies the identified set of pre-authorization criteria comprises determining that the merchant associated with the transaction request matches at least one of the at least one pre-authorized merchants in the set of pre-authorization criteria, and wherein the channel through which the requested transaction is performed matches the at least one pre-authorized transaction channel corresponding to the merchant associated with the transaction request, wherein at least one channel associated with the merchant is not pre-authorized to allow NCP transactions prior to activation of the payment instrument.

7. The system of claim 6, wherein, in response to determining that either the merchant associated with the transaction request does not match at least one of the at least one pre-authorized merchants or that the channel through which the requested transaction is performed does not match the at least one pre-authorized transaction channel corresponding to the merchant associated with the transaction request, the instructions instruct the at least one hardware processor to reject the transaction request and transmit, via the communications interface and to the merchant system, a fourth signal comprising a transaction rejection corresponding to the received transaction request.

8. The system of claim 1, wherein the instructions instruct the at least one hardware processor to:
- receive, via the communications interface, a fifth signal comprising an indication that the payment instrument associated with the first credit account is activated; and
- in response to activation of the payment instrument, removing the second indicator associated with the first credit account in the repository storing the plurality of credit accounts.

9. The system of claim 1, wherein no physical version of the payment instrument is generated for the first credit account after the first credit account is opened and prior to the transaction request.

10. A non-transitory, computer-readable medium storing computer-readable instructions executable by a computer and configured to perform operations comprising:
- receiving, via a communications interface and from a merchant system, a first signal comprising a transaction request associated with a no card present (NCP) transaction associated with a first credit account in a plurality of credit accounts, wherein the transaction request is triggered by an application of the merchant system and is associated with a set of transaction data comprising an identifier of a channel through which the requested transaction is performed, wherein each credit account associated with a customer, wherein each credit account is associable with a first indicator that indicates whether a payment instrument associated with a corresponding credit account has been activated, and wherein each credit account is associable with a second indicator that indicates whether at least one pre-authorization rule has been associated with the corresponding credit account, wherein at least some of the credit accounts in the plurality of credit accounts are opened after an instant credit decision and are made available for use by customers and merchants in limited transactions prior to physical versions of the payment instructions corresponding to those credit accounts being activated;

determining that the first credit account is associated with an unactivated payment instrument based on the first indicator;

determining that the first credit account is associated with a second indicator indicating that at least one pre-authorization rule from a set of pre-authorization rules for authorizing NCP transactions prior to activation of a payment instrument associated with the corresponding credit account is associated with the first credit account;

identifying a set of pre-authorization criteria associated with the at least one pre-authorization rule associated with the first credit account;

comparing the set of transaction data associated with the transaction request to the identified set of pre-authorization criteria to generate a comparison result;

determining, based on the comparison result, that the set of transaction data associated with the transaction request satisfies the identified set of pre-authorization criteria;

generating a transaction authorization for the transaction request received through the channel identified as a pre-authorized transaction channel and satisfying the identified set of pre-authorization criteria; and transmitting, via the communications interface and to the merchant system, a second signal comprising the transaction authorization corresponding to the received transaction request.

11. The non-transitory, computer-readable medium of claim 10, wherein the instructions are configured to, in response to determining that the set of transaction data associated with the transaction request does not satisfy the identified set of pre-authorization criteria, rejecting the transaction request and transmitting, via the communications interface and to the merchant system, a third signal comprising a transaction rejection corresponding to the received transaction request.

12. The non-transitory, computer-readable medium of claim 10, wherein the determination of whether the first credit account is associated with a second indicator indicates that at least one pre-authorization rule is associated with the first credit account is only performed in response to determining that the set of transaction data includes a non-tokenized set of payment data associated with the first credit account.

13. The non-transitory, computer-readable medium of claim 12, wherein the non-tokenized set of payment data associated with the first credit account is stored at a merchant system associated with the transaction request and associated with a customer account managed by the merchant system, wherein the transaction associated with the transaction request is initiated by the customer when the customer does not have access to the non-tokenized set of payment data associated with the first credit account.

14. The non-transitory, computer-readable medium of claim 10, wherein the set of transaction data comprises an identification of a merchant associated with the transaction request.

15. The non-transitory, computer-readable medium of claim 14, wherein the set of pre-authorization criteria associated with the at least one pre-authorization rule associated with the first credit account comprises an identification of at least one pre-authorized merchant and at least one pre-authorized transaction channel corresponding to each of the at least one pre-authorized merchants, and wherein determining that the set of transaction data associated with the transaction request satisfies the identified set of pre-authorization criteria comprises determining that the merchant associated with the transaction request matches at least one of the at least one pre-authorized merchants in the set of pre-authorization criteria, and wherein the channel through which the requested transaction is performed matches the at least one pre-authorized transaction channel corresponding to the merchant associated with the transaction request, wherein at least one channel associated with the merchant is not pre-authorized to allow NCP transactions prior to activation of the payment instrument.

16. The non-transitory, computer-readable medium of claim 15, wherein, in response to determining that either the merchant associated with the transaction request does not match at least one of the at least one pre-authorized merchants or that the channel through which the requested transaction is performed does not match the at least one pre-authorized transaction channel corresponding to the merchant associated with the transaction request, the instructions are configured to reject the transaction request and transmit, via the communications interface and to the merchant system, a fourth signal comprising a transaction rejection corresponding to the received transaction request.

17. The non-transitory, computer-readable medium of claim 10, wherein the instructions are configured to:

receive, via the communications interface, a fifth signal comprising an indication that the payment instrument associated with the first credit account is activated; and in response to activation of the payment instrument, remove the second indicator associated with the first credit account.

18. The non-transitory, computer-readable medium of claim 10, wherein no physical version of the payment instrument is generated for the first credit account after the first credit account is opened and prior to the transaction request.

19. A computerized method performed by one or more computer processors, the method comprising:

receiving, via a communications interface and from a merchant system, a first signal comprising a transaction request associated with a no card present transaction (NCP) with a first credit account in a plurality of credit accounts, wherein the transaction request is triggered by an application of the merchant system and is associated with a set of transaction data comprising an identifier of a channel through which the requested transaction is performed, wherein each credit account associated with a customer, wherein each credit account is associable with a first indicator that indicates whether a payment instrument associated with a corresponding credit account has been activated, and wherein each credit account is associable with a second indicator that indicates whether at least one pre-authorization rule has been associated with the corresponding credit account, wherein at least some of the credit accounts in the plurality of credit accounts are opened after an instant credit decision and are made available for use by customers and merchants in limited transactions prior to physical versions of the payment instructions corresponding to those credit accounts being activated;

determining that the first credit account is associated with an unactivated payment instrument based on the first indicator;

determining that the first credit account is associated with a second indicator indicating that at least one pre-authorization rule from a set of pre-authorization rules for authorizing NCP transactions prior to activation of a payment instrument associated with the corresponding credit account is associated with the first credit account;

identifying a set of pre-authorization criteria associated with the at least one pre-authorization rule associated with the first credit account;

comparing the set of transaction data associated with the transaction request to the identified set of pre-authorization criteria to generate a comparison result;

determining that the set of transaction data associated with the transaction request satisfies the identified set of pre-authorization criteria;

generating a transaction authorization for the transaction request received through the channel identified as a pre-authorized transaction channel and satisfying the identified set of pre-authorization criteria; and transmitting, via the communications interface and to the merchant system, a second signal comprising the transaction authorization corresponding to the received transaction request.

20. The computerized method of claim 19, wherein in response to determining that the set of transaction data associated with the transaction request does not satisfy the identified set of pre-authorization criteria, the method further comprises rejecting the transaction request and transmitting, via the communications module, a third signal comprising a transaction rejection corresponding to the received transaction request.

* * * * *